United States Patent [19]

Boyd

[11] Patent Number: 4,905,803
[45] Date of Patent: Mar. 6, 1990

[54] BRAKE ACTUATORS FOR BICYCLES

[76] Inventor: Winnett Boyd, 107 Victoria Place, Bobcaygeon Ontario, Canada

[21] Appl. No.: 370,833

[22] Filed: Jun. 23, 1989

[51] Int. Cl.$^4$ .......................... B62L 5/00; F16D 41/34
[52] U.S. Cl. ...................................... 192/5; 192/41 S; 192/107 T; 188/24.17; 74/594.1
[58] Field of Search ............... 192/5, 6 B, 41 S, 81 C, 192/107 T; 188/24.17, 82.6; 74/594.1

[56] References Cited

U.S. PATENT DOCUMENTS

| | | | |
|---|---|---|---|
| 1,488,714 | 4/1924 | Schurmann | 192/5 |
| 1,714,496 | 5/1929 | Chilton | 192/81 C |
| 1,939,730 | 12/1933 | Starkey | 192/41 S |
| 2,940,563 | 6/1960 | Milenkovic et al. | 192/5 |
| 3,040,856 | 6/1962 | Shoquist | 192/81 C |
| 3,555,919 | 1/1971 | Odell | 192/41 S |
| 4,313,530 | 2/1982 | Boyd | 192/41 S |

FOREIGN PATENT DOCUMENTS

| | | | |
|---|---|---|---|
| 478084 | 10/1951 | Canada | 192/41 S |
| 300578 | 9/1932 | Italy | 192/5 |
| 456997 | 4/1950 | Italy | 188/24.17 |
| 539186 | 1/1977 | U.S.S.R. | 192/41 S |
| 120305 | 11/1918 | United Kingdom | 192/5 |

OTHER PUBLICATIONS

Xerox Disclosure Journal, *Acceleration Control of Wrap Spring Clutches*, vol. 4, No. 5, Sep.-Oct. 1979, p. 587.
'Dercon High Temperature Mold Maker', information sheet, Dercon Corp., Oct. 1985.

*Primary Examiner*—Richard Lorence
*Attorney, Agent, or Firm*—Ridout & Maybee

[57] ABSTRACT

In a spring clutch arrangement for housing in the lower bracket of a bicycle in order to operate a bicycle brake, a conventional waisted pedal crankshaft is modified to provide a cylindrical surface which supports the clutch spring by application of a resin bonded material of high compressive strength and high coefficient of friction. A preferred material is an epoxy resin loaded with aluminum powder having a surface layer of alumina.

5 Claims, 1 Drawing Sheet

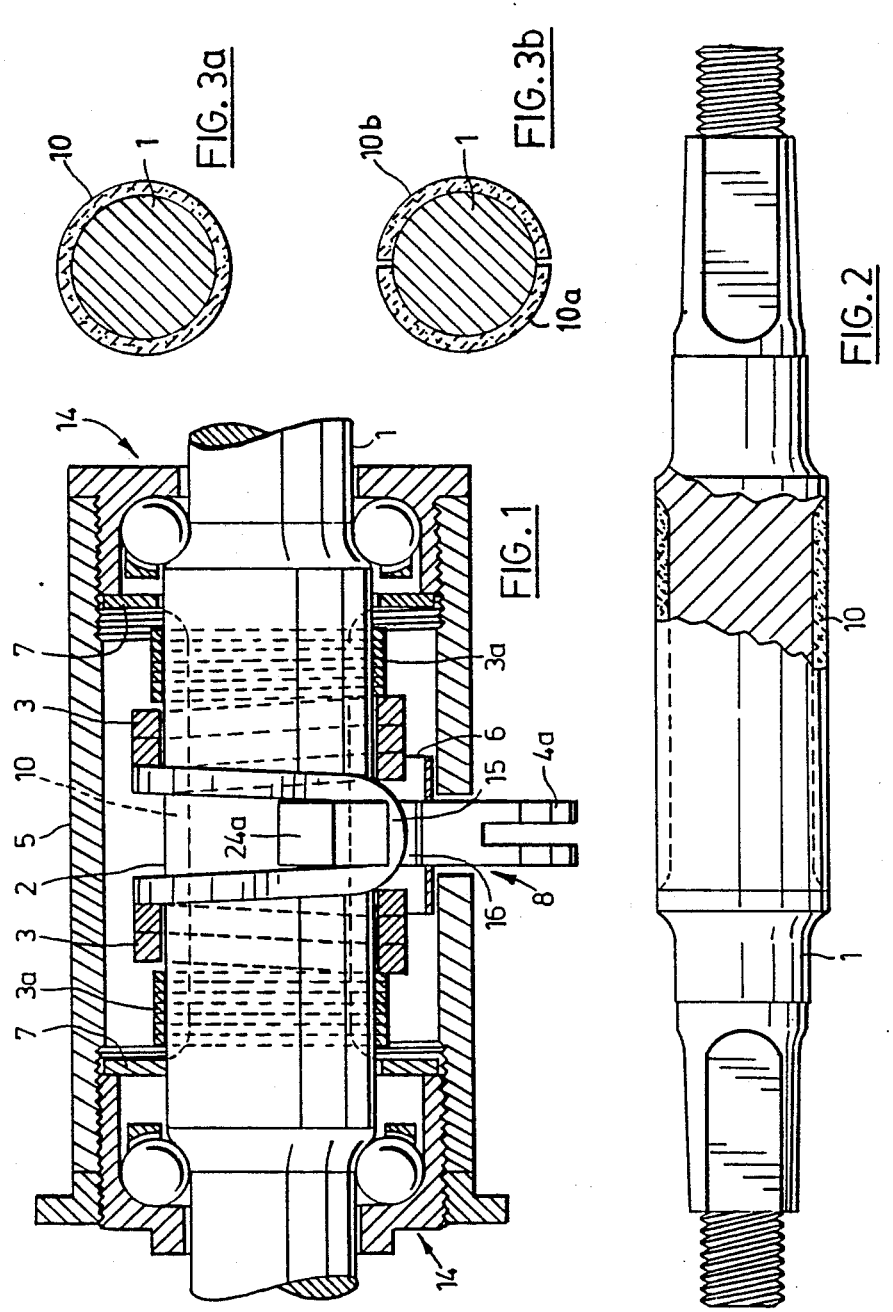

BRAKE ACTUATORS FOR BICYCLES

BACKGROUND OF THE INVENTION

1. Field of the Invention

This invention relates to brake actuators for bicycles, and related pedal operated vehicles.

2. Review of the Art

My U.S. Pat. No. 4,313,530 issued Feb. 2, 1982 describes a brake actuator for bicycles which has proven quite satisfactory in practice. It enables an effective, durable and relatively easily manufactured clutch to be accommodated within the space available in the pedal crank housing in the bottom bracket of typical bicycles. Two problems remain in the implementation of the invention. Firstly, typical mass produced pedal crankshafts are not designed to carry such a clutch, and typically have a waisted centre portion between the bearing races. This entails either using a custom forged crankshaft or building up the diameter of the central portion of the shaft by some form of metal deposition process. Both solutions are expensive. Secondly, even with the spring structure of the invention, the length of the spring required is such as to be a close fit within the available space. The longer the spring, the more turns it has and the more difficult it becomes to maintain concentricity of the turns during manufacture and assembly. A reduction in the number of turns in the spring would be a substantial advantage if it could be achieved.

SUMMARY OF THE INVENTION

I have now surprisingly found that both of these problems can be addressed by utilizing a higher friction material with high compressive strength to build up the diameter of the central portion of the shaft.

At first sight, the use of higher friction material to form the bearing surface of the shaft might seem undesirable, because of the increased drag on the spring during normal operation of the bicycle. In practice this increased drag is minimal, since any increase in drag produces a negative feedback effect which will tend to unwind the spring further thus reducing drag.

During braking operation, the increase in friction provides a positive feedback effect, resulting in a more rapid development of braking forces through interaction between the clutch spring and the shaft. This in turn enables the spring to be shortened, thus simplifying manufacture and assembly.

I have found that whilst compositions of the type used for automotive brake pads and shoes may be utilized to provide shells which may be cemented over a central portion of the crankshaft to bring it to a desired diameter, a particularly effective technique involves the application of a high strength castable resin loaded with particles having a surface hardness greater than that of the material of the spring.

Accordingly, the invention provides a device for operating a brake of a pedal operated vehicle of the kind in which a brake operating lever projects through an opening in a pedal crankshaft housing of the vehicle, the lever being connected to a bight connecting two spring coils which concentrically surround and frictionally engage a pedal crankshaft within the housing; wherein the spring engages a cylindrical surface of the pedal crankshaft formed by a layer of cast material bonded to the shaft and formed of high friction particles bonded by a high strength binder. Preferably the particles have a surface hardness greater than that of the spring coils.

Further features of the invention will be apparent from the following description of a preferred embodiment thereof.

SHORT DESCRIPTION OF THE DRAWINGS

FIG. 1 is a vertical section extending laterally through the bottom bracket of a bicycle;

FIG. 2 is an elevation of a pedal crankshaft, partially broken away to show its internal structure;

FIGS. 3a and 3b are cross-sections through two different embodiments of the crankshaft shown in FIG. 2.

FIG. 1 is very similar to FIG. 1 of my U.S. Pat. No. 4,313,530, all parts shown therein other than the pedal crankshaft 1 being as described in that patent, the disclosure and drawings of which are incorporated herein by reference. A brake operating mechanism is housed in the space between the pedal crankshaft 1 and a housing formed by the bottom bracket 5 of a bicycle, in which the crankshaft is journalled by conventional ball race assemblies 14. The major components of the brake operator are a lever comprising a yoke 24a and a lever arm 4a, and a spring coil assembly comprising spring coils 3 joined to one another by a connecting loop 15 or bight which engages a complementary groove 16 formed in one arm of the yoke 24a. The lever arm 4a projects through a slot 8, and an apertured shield 6 placed over the arm prevents dirt from entering the slot and helps retain the loop 15 in the slot 16.

The inner portions of the coils 3 and the loop 15 are formed of a continuous length of square section steel wire, and the outer portions 3a of the coils are formed of wire of a smaller cross-section than the inner portions. The inside diameter of the turns in the portions 3a is such that they lightly embrace the surface 2 of the crankshaft; the inside diameter of the turns of the inner portion is slightly greater so that they do not normally contact the surface of the crankshaft. As long as the pedal crankshaft is turned in a forward direction corresponding to normal forward pedalling of the bicycle to which the arrangement is fitted, drag between the outer portions of the coil and the crankshaft will tend to unwind the spring and lessen the drag. Upon back pedalling, the drag will tend to tighten first the outer portions and then the inner portions of the spring onto the crankshaft with a positive feedback or self-servo effect, causing the spring to grip the crankshaft and move the yoke with the crankshaft. The movement of the yoke is transmitted through the lever arm 4a to a braking mechanism of the bicycle.

A certain minimum number of turns in the spring is necessary to ensure that adequate frictional engagement can be developed between the spring and the crankshaft, which can be determined by the formula $$T_1/T_2 = e^{f\alpha}$$

where $T_1$ is the tension at the end of the spring coil engaging the yoke, $T_2$ is the tension developed at the free end of the coil, f is the coefficient of friction between the coil and the shaft and $\alpha$ is the total angle of contact between the coil and the shaft, and e is the base of natural logarithms.

Thus to maintain a given ratio between the tensions, an increase in coefficient of friction permits a shorter spring with a lower wrap angle. I therefore find that I can advantageously use a conventional bicycle pedal crankshaft, which has a waisted central portion, and bond high friction material 10 around the central portion to provide a cylindrical support surface for the spring (see FIG. 2).

I have developed two techniques for applying the high friction material. In a first technique, illustrated in FIG. 3a, a suitable material is cast around the waisted portion of the shaft in a cylindrical mould, and cured in situ. The material must have various qualities which I have found are met by certain curable resin compositions intended for mould making. An example is high temperature mould maker resin from Devcon Corp., which is a curable liquid epoxy resin loaded with aluminium powder. The resin is mixed with a hardener in conventional fashion prior to use, and cured in situ. Since a good bond to the shaft is desired, the mould, but not the shaft, is treated with a release agent prior to application of the resin mixture. It is believed that the aluminium powder enhances the effective coefficient of friction of the cured region since the particles of such a powder will carry a hard refractory alumina oxide film, with a surface hardness higher than that of the spring. At the same time, this film is supported by malleable metallic particles in turn bonded by high strength resin, such that the resin can provide a wear resistant, relatively high friction, but not abrasive surface. The resin also has a very high compressive and flexural strength, necessary to sustain the heavy compressive loadings applied by the spring during braking, can withstand high temperatures and has good heat conductivity (thus avoiding local frictional hot spots). For example, according to its manufacturer, the specified high temperature mould maker resin has a compressive strength after curing of 36500 psi and a flexural strength of 10240 psi.

The coefficient of friction between this material and steel clutch spring is approximately double that between a similar spring and a ground steel shaft surface.

Whilst other castable resin materials filled with metal or metal oxide particles could undoubtedly be used, the above material is the best suited to the applicable of which I am presently aware.

In a second technique, semi-cylindrical mouldings 10a, 10b of high friction material as used for brake pads for vehicles are resin bonded to either side of the crankshaft as shown in FIG. 3, again with a view to providing a crankshaft surface of high compressive strength with a coefficient of friction substantially greater than that of ground steel. Such mouldings consist of particles of high friction material bonded by a high strength binder, and have high compressive strength without being abrasive in order to suit their primary purpose.

I claim:

1. A device for operating a brake of a pedal operated vehicle of the kind in which a brake operating lever projects through an opening in a pedal crankshaft housing of the vehicle, the lever being connected to a bight connecting two spring coils which concentrically surround and frictionally engage a pedal crankshaft within the housing; wherein the spring engages a cylindrical braking surface formed on the pedal crankshaft by a layer of cast material bonded to the crankshaft and formed of high friction particles bonded together by a high strength binder.

2. A device according to claim 1, wherein the particles have a surface hardness greater than that of the spring coils.

3. A device according to claim 2, wherein the particles are of aluminium with a surface layer of alumina, and the resin is an epoxy resin.

4. A device according to claim 2, wherein the cast material is a high temperature mould maker resin.

5. A device according to claim 1, wherein the cast material consists of preformed part cylindrical segments of brake pad material resin bonded to the crankshaft.

* * * * *